United States Patent

[11] 3,525,360

| [72] | Inventor | Ray M. Bacchi<br>Oakland, California |
|---|---|---|
| [21] | Appl. No. | 763,719 |
| [22] | Filed | Sept. 30, 1968 |
| [45] | Patented | Aug. 25, 1970 |
| [73] | Assignee | De Laval Turbine Inc.<br>a corporation |

[54] LUBRICATING OIL CONTROL VALVE
8 Claims, 3 Drawing Figs.

| [52] | U.S. Cl. | 137/563 |
|---|---|---|
| [51] | Int. Cl. | F16n 7/40 |
| [50] | Field of Search | 137/563, 108 |

[56] References Cited
UNITED STATES PATENTS

| 2,473,953 | 6/1949 | Huber et al | 137/108 |
| 2,647,530 | 8/1953 | Vaquith | 137/108 |

Primary Examiner— M. Cary Nelson
Assistant Examiner— William R. Cline
Attorney—Lothrop and West ABSTRACT: An engine lubricating oil control valve has a housing with a bore with which communicate an inlet port from an oil pressure pump and outlet ports either side of the inlet port, the outlet ports being open to a sump and there being lands either side of both outlet ports. A sleeve slidable in the bore is ported like the housing, is urged in one direction by a control spring and oil pressure in an engine oil distributing conduit, and is urged in the opposite direction by inlet oil pressure. A spool slidable in the sleeve and having grooves defining lands controlling the sleeve ports is urged in the opposite direction by a regulating spring and sump oil pressure and is urged in the one direction by oil pressure in the engine oil distributing conduit.

INVENTOR.
RAY M. BACCHI
BY
Lothrop & West
ATTORNEYS

LUBRICATING OIL CONTROL VALVE

In the operation of relatively large engines such as are utilized for the propulsion of ships and for the stationary generation of electric power and gas compression, it is important to maintain the lubricating oil at proper pressure and condition at all times. It is customary to provide an oil pressure pump either driven by the engine or separately driven which has a capacity to supply all of the oil needed for lubricating the engine at maximum conditions. Since this quantity of oil is not ordinarily needed, it is preferred to bypass a portion thereof. It is customary to provide the bypass in such a fashion that the entire quantity of the oil is passed through strainers and filters and the like as well as any connecting piping and ducts before being released by a pressure regulator valve. It is also customary to provide an oil heat exchanger in order to maintain the oil temperature at the desired value since the circulating oil should be maintained at a selected temperature within reasonable limits. The heat exchanger has capacity for the maximum oil flow and is bulky since it usually operates with only a small temperature differential.

It is therefore an object of the invention to provide an engine lubricating oil control valve which can act to regulate the engine oil pressure in accordance with the desired pressure at some selected or set point within the engine lubricating oil system.

Another object of the invention is to provide an engine lubricating oil control valve which will establish a selected differential between the oil pump pressure and the selected pressure at some convenient point in the engine.

Another object of the invention is to provide a control valve which limits the maximum pressure that can be impressed on the pump connected mechanisms.

A further object of the invention is to provide an engine lubricating oil control valve which can be adjusted as to the selected value for the oil pump discharge pressure.

Another object of the invention is to provide an engine lubricating oil valve that can be incorporated in a lubricating system involving prompt pressure release of much of the oil usually circulated.

A further object of the invention is in general to provide an engine lubricating oil control valve of an improved character.

Other objects together with the foregoing are attained in the embodiment of the invention described in the accompanying description and illustrated in the accompanying drawings, in which.

Although the lubricating oil control valve can be embodied in a number of different ways and can be utilized in various different environments for sundry purposes, it has been successfully employed in a relatively large internal combustion, stationary engine having a lubricating oil pressure system. The lubricating oil is taken from a sump or reservoir and is subjected to pressure by a force pump. The oil is then circulated by a conduit, manifold or other connecting means to various parts of the engine which require lubrication. Pressure oil which discharges from between bearing surfaces or spray jets is caught in the sump or is returned to a reservoir at low, usually atmospheric, pressure. Excessive oil under pressure not required for lubrication under usual conditions is short-circuited to the sump at low pressure for recirculation. In the high pressure system are appropriate filters, strainers and heat exchangers. These are not illustrated in detail herein since they are well recognized in this field.

Figure 2:
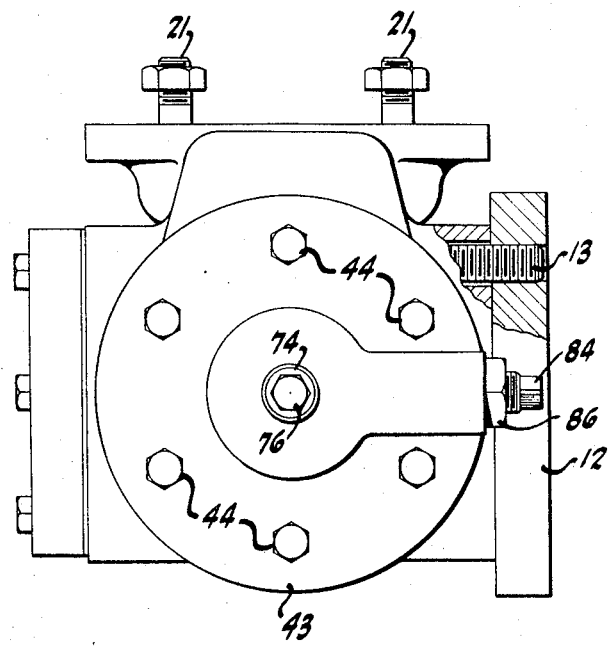
FIG. 2 is an end elevation of the structure shown in FIG. 1 with a portion of the figure broken away to show the interior construction.

In my improved oil control valve there is provided a housing 6 conveniently of cast metal and arranged to be mounted at any appropriate location on the engine for ready connection of the appropriate pipes. The housing 6 has a central, circular cylindrical bore 7 extending from one end thereof virtually to the other end, the bore being concentric with a longitudinal axis 8. About midway of the bore there is afforded an inlet port 9. This is an annulus of larger diameter than the diameter of the bore and is in communication with an inlet opening 11 to which an appropriate lubricating oil supply pipe (not shown) is connected. Conveniently, the opening 11 leads through a flange 12 (FIG. 2) removably mounted on the housing by a plurality of studs 13 so that different flanges 12 can be mounted on the housing from time to time to serve as adapters for different installations. In every case oil under pressure from a force pump, not shown, enters the opening 11 and flows under pressure into the central inlet port 9.

Also formed within the housing 6 is a pair of outlet ports 16 and 17 each annular in form and surrounding the bore 7. The outlets 16 and 17 are located about equidistantly from the center on opposite sides of the inlet port 9. Linking the outlet ports 16 and 17 is a duct 18 leading to an opening 19 in a housing flange. Means such as bolts 21 are provided for connecting a discharge pipe (not shown) to a source of low pressure; for example, directly to the engine sump at substantially atmospheric pressure. The intersections of the port 9 and of the ports 16 and 17 with the central bore establish lands 22 and 23 on opposite sides of the outlet port 16 and lands 24 and 26 on opposite sides of the outlet port 17. The lands are carefully dimensioned in an axial direction so that their edges serve as accurate shearing surfaces.

Located coaxially within the bore 7 and fitted to slide freely therein is a valve sleeve 31 circular cylindrical in exterior configuration and having an inlet port 32 which includes a number of openings. The sleeve inlet port 32 is designed to communicate with the housing inlet port 9. Also formed in the sleeve 31 are outlet ports 33 and 34 approximately registering with the outlets 16 and 17 and defining intervening lands on the sleeve. Each of the ports 33 and 34 may include a number of openings.

At one end the sleeve 31 opens into a control chamber 36 provided in one end of the housing 6 and closed by a cover plate 37 removably secured by fasteners 38. The control chamber 36 connects with a control port 39 through the cover 37. A conduit, not shown, extends from the control port 39 to any suitable point on the engine at which the local pressure of lubricating oil is to be sensed. For example, a suitable sensing point is at the entrance of the lubricating oil under pressure to the engine oil distributing system. Thus, the chamber 36 is subjected to the pressure of the lubricating oil at the sensing point in the engine, and that pressure is always exerted on the annular, end face of the sleeve 31, at the left in FIG. 3.

Also exerting an augmenting force on the end of the sleeve is a control spring 41 disposed within the chamber 36. One end of the spring abuts the cover plate 37, and the other end presses against a guide cup 42 interposed between the spring end and the annular sleeve end. The forces of the oil pressure in the chamber 36, detected at the sensing point, and of the spring 41 both urge the sleeve in one direction, toward the right in FIG. 3. The motion of the sleeve toward the right in FIG. 3 is limited by a closure plate 43 held in position by fastenings 44 and having a seat 46 acting as a stop.

Figure 3:
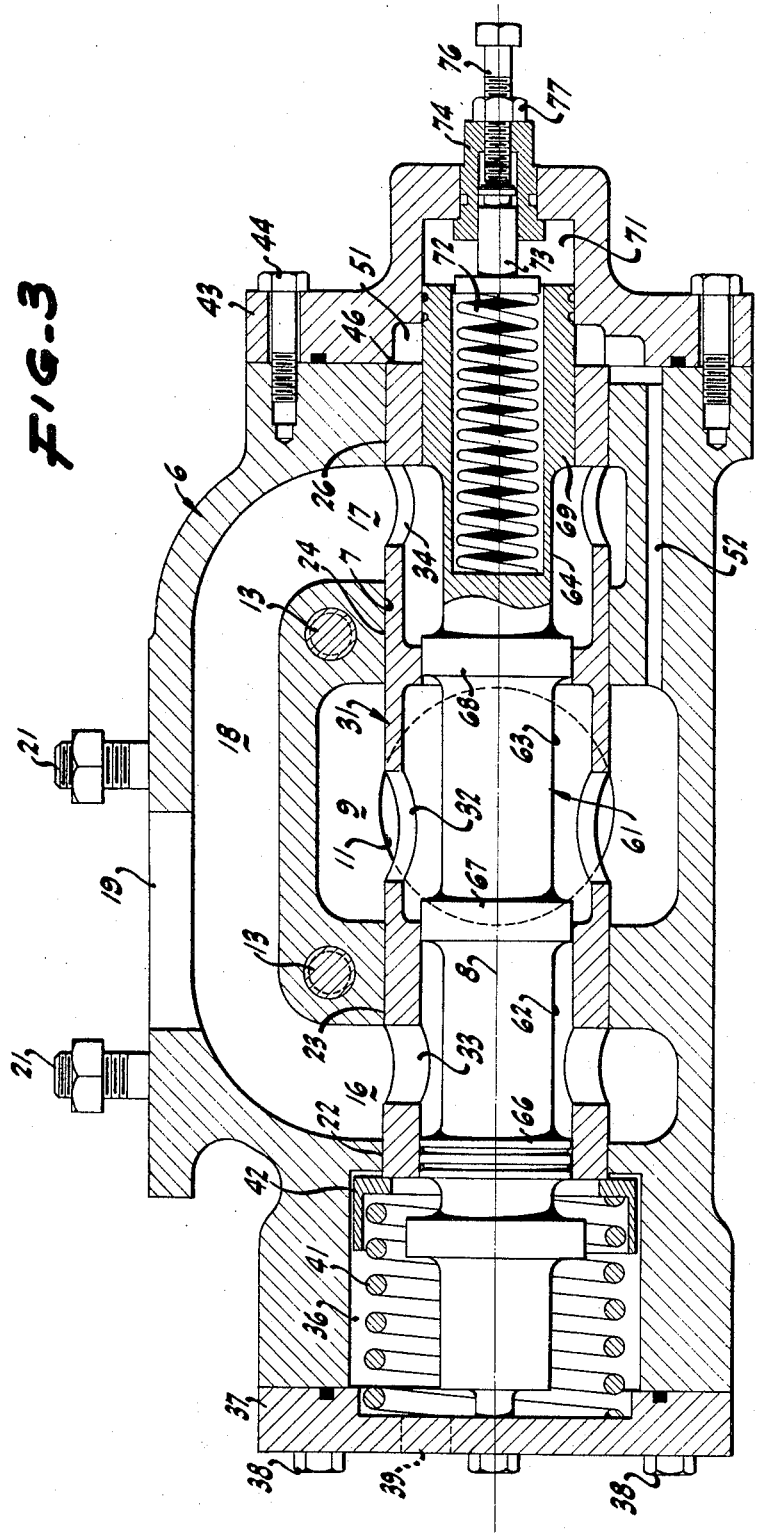
FIG. 3 is a cross-section to an enlarged scale of the structure disclosed in FIG. 1, the plane of section being indicated by the line 3—3 in FIG. 1.

The right end of the valve sleeve 31 is subjected to a force tending to move the valve sleeve toward the left in FIG. 3. The valve sleeve at the right end in FIG. 3 is exposed to pressure within a regulating chamber 51 formed in the cover 43 and of annular configuration. The chamber 51 is joined by a passage 52 in the housing 6 to the inlet port 9 so that the regulating chamber 51 and the right end of the valve sleeve are always subjected to the pressure in the inlet port 9.

Disposed within the sleeve is a valve spool 61 of circular cylindrical configuration situated for sliding movement coaxially with the sleeve 31 and with the bore 7. The spool 61 is formed with a number of grooves 62, 63 and 64 flanking which are lands 66, 67, 68 and 69 providing shear edges to cooperate with the corresponding shear edges of the sleeve.

The valve spool at the right end, in FIG. 3, is exposed to pressure within a sump chamber 71 enclosed by the plate 43. Also disposed in the sump chamber 71 is a regulating spring 72 recessed within the end of the valve spool and seated on an adjusting stem 73 slidable within a thimble 74 mounted within the plate 43. The stem 73 is located by means of an adjusting screw 76 locked in position by a nut 77. With this arrangement, the right end of the valve spool 61 is subjected not only to the sump oil pressure (approximately atmospheric) against its exposed end surface, but is likewise urged toward the left by the regulating spring 72, the amount of force depending upon the amount of compression of the spring 72 by the adjustment of the screw 76.

Figure 1:
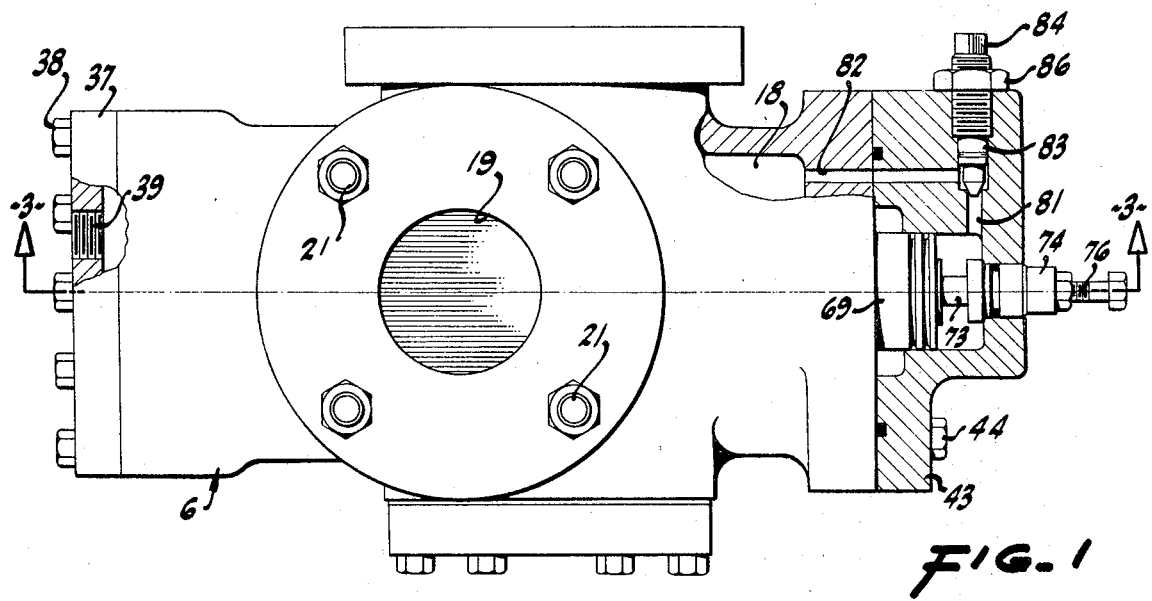
FIG. 1 is a plan of a lubricating oil control valve with a portion of the structure broken away to disclose in cross-section on a diametral plane a portion of the interior construction of the valve.

The drain or sump chamber 71, as shown in FIG. 1, is connected by a conduit 81 in the cover 43 and a connecting conduit 82 in the housing to the outlet passage or duct 18, so that the pressure within the sump chamber 71 is that of the sump oil, which is virtually atmospheric. In order to restrict the fluid flow through the conduits 81 and 82 so as to afford some damping or dashpot action of the valve spool, there is provided a needle valve 83 extending through the cover 43 to an exterior adjustment, the needle valve 83 having a wrench-receiving portion 84 and a lock nut 86. The resistance to flow in and out of the chamber 71 can be varied to provide sufficient flow resistance to offset hunting of the valve spool.

With the arrangement as described and as connected, operation at start-up begins with the parts in the position shown in FIG. 3; that is, with the valve sleeve against its seat or stop 46 under the urgency of the control spring 41 and the valve spool 61 against the cover 37 as a stop at the left end under the urgency of the regulating spring 72.

When the lubricating oil pump is started, oil under pressure enters the housing 6 through the inlet port 9 and continues into the interior of the sleeve around the spool between the lands 67 and 68. Since the lubricating oil control valve is installed as a shunting valve between the oil pressure line from the pump and the sump, some oil under pressure flows into the lubricant circulating system of the engine. Its pressure is transmitted from the sensing point through the control port 39 into the control chamber 36. That pressure, being exerted on the end of the valve spool 61 and being opposed by the spring 72, eventually rises to a value high enough to move the valve spool 61 to the right in FIG. 3. This movement disengages the lands 67 and 68 from the adjacent portions of the valve sleeve and thus permits incoming oil from the inlet port 9 to flow over the lands 67 and 68 through the outlets 33 and 34 to return through the opening 19 to the sump. As long as the pressure at the sensing point is sufficient to displace the valve spool to the right with respect to the valve sleeve, excess oil is bypassed to the sump. If the oil supply decreases so that the pressure at the sensing point drops and lowers the pressure within the chamber 36, then the regulating spring 72 translates the valve spool to the left in FIG. 3, re-establishing the interengagement of the lands 67 and 68 with the surrounding sleeve and interrupts the bypass of oil through the regulator from the inlet 9 to the outlet 19. In this way the spool operates to maintain the required pressure at the sensing point, as established by the regulating spring 72.

By turning the adjusting screw 76, the regulated pressure can be varied. In this fashion there is afforded a carefully regulated pressure for the lubricating oil as determined by the pressure at the sensing point. The movement of the valve spool is not immediately responsive to minor changes in pressure at the sensing point since the needle valve 83 controls the flow into and from the sump chamber 71. A smooth rather than a jerky or erratic or hunting response is had.

The pressure in the inlet port 9 is communicated through the conduit 52 to the regulating chamber 51 and is therein effective against the right-hand end of the valve sleeve 31. The left-hand end of the valve sleeve 31 is of substantially equal area and is subjected to the pressure in the control chamber 36 plus the pressure of the spring 41. If at any time the pump discharge pressure exceeds a certain selected differential over the pressure at the control point, the amount of the differential being established by the spring 41, the excessive pump pressure within the regulating chamber 51 forces the valve sleeve to the left in FIG. 3, overcoming the control pressure in the chamber 36 and the urgency of the spring 41. This motion of the sleeve disengages the sleeve lands from the lands 67 and 68 of the valve spool and permits inlet oil under the excessive pressure to flow from the port 9 immediately over the lands 67 and 68 to the outlet 19 for return to the sump. This portion of the valve is effective to limit the maximum differential pressure between the pump outlet pressure and the selected pressure at the control point.

The outlet 19 preferably opens directly into the engine sump. The oil returned therethrough need not be sent through any straining, filtering or heat exchange units, and only the relatively small amount which goes to the engine oil circulating system need go through the straining, filtering and cooling mechanisms. This is possible since the maximum oil pressure on the system is established by the spring 41 plus the control point pressure, in turn dependent upon the value impressed on the valve spool by the spring 72. It is thus entirely possible to fix the maximum oil pressure in the entire system and so it is feasible to include the oil filter, oil strainer and oil heat exchanger in the engine lubricating oil line without fear of disruption by excessive oil pressure or excessive differential pressure across the internal elements. The use of the valve therefore makes it possible to design the external engine lubricating system smaller than usual in that the pressure vessels need handle only the lubricating oil directly delivered to the engine circulating system and need not handle the large amount of oil which may be discharged to the engine sump.

I claim:

1. A lubricating oil control valve for use with an engine having an oil pressure pump, an oil distributing conduit and a sump, the valve comprising a housing having a bore with a central inlet port, a pair of lateral outlet ports one either side of said inlet port and circular cylindrical lands on opposite sides of both of said outlet ports, a valve sleeve slidably disposed in said bore and having inlet and outlet openings adapted to register with said ports, a valve spool slidably disposed within said sleeve and having an inlet groove and a pair of outlet grooves adapted to register with said openings and having lands on opposite sides of both of said outlet grooves, means on one end of said housing enclosing a control chamber into which one end of said sleeve and one end of said spool open, a control spring in said control chamber and abutting said sleeve to urge said sleeve out of said control chamber, means on the other end of said housing enclosing a regulating chamber into which only the other end of said sleeve opens, means on the other end of said housing enclosing a drain chamber into which only the other end of said spool opens, a regulating spring in said drain chamber and abutting said spool to urge said spool out of said regulating chamber, means for connecting said inlet port to said oil pressure pump, means for connecting said outlet ports and said drain chamber to said sump, and means for connecting said control chamber to said distributing conduit.

2. A lubricating oil control valve as in claim 1 including means providing a stop for said spool against the urgency of said regulating spring.

3. A lubricating oil control valve as in claim 1 including means providing a stop for said sleeve against the urgency of said control spring.

4. A lubricating oil control valve as in claim 1 including means for controlling said connecting means between said drain chamber and said sump.

5. A lubricating oil control valve as in claim 1 including means for varying the urgency of said regulating spring.

6. A lubricating oil control valve as in claim 1 including means providing a stop for said sleeve against the urgency of pressure in said regulating chamber.

7. A lubricating oil control valve as in claim 1 in which said sleeve and said spool are coaxial.

8. A lubricating oil control valve as in claim 1 in which said sleeve and said spool are urged in opposite axial directions by said control spring and said regulating spring.